May 24, 1966     H. H. AST     3,253,275

MULTILAMP INDICATOR ASSEMBLY

Filed Dec. 28, 1962     4 Sheets-Sheet 1

HERBERT H. AST
INVENTOR.

BY
Nilsson & Robbins
ATTORNEYS

May 24, 1966    H. H. AST    3,253,275
MULTILAMP INDICATOR ASSEMBLY
Filed Dec. 28, 1962    4 Sheets-Sheet 2

HERBERT H. AST
INVENTOR.

BY
Nilsson & Robbins
ATTORNEYS

May 24, 1966     H. H. AST     3,253,275
MULTILAMP INDICATOR ASSEMBLY
Filed Dec. 28, 1962     4 Sheets-Sheet 3

HERBERT H. AST
INVENTOR.

BY Nilsson & Robbins

ATTORNEYS

May 24, 1966 H. H. AST 3,253,275
MULTILAMP INDICATOR ASSEMBLY
Filed Dec. 28, 1962 4 Sheets-Sheet 4

HERBERT H. AST
INVENTOR.

BY Nilsson & Robbins
ATTORNEYS.

United States Patent Office 3,253,275
Patented May 24, 1966

3,253,275
MULTILAMP INDICATOR ASSEMBLY
Herbert H. Ast, 1361 Betea Place, Pacific Palisades, Calif.
Filed Dec. 28, 1962, Ser. No. 247,942
8 Claims. (Cl. 340—381)

This invention relates generally to electrical illumination devices and more particularly to multicolor indicator and, in some embodiments, electrical switching assemblies.

In modern control and monitoring systems such as utilized, for example, in missile control complexes, radar control centers, automated industrial systems, building complex air conditioning, airborne and shipboard maintenance and guidance systems, nuclear reactors, and the like, it is generally desirable and often essential that a large number of monitoring indicator lamps and control switches be arranged at a particular, single location. It is not uncommon for such a system to require many hundreds of indication functions and sequences of functions with a large number of associated switching or control functions. Typically, a number of mutlicolor indicator units are mounted in an appropriate array on a display-control panel with each unit labeled as by a transparent frontal legend plate to designate which item or function it is monitoring. It is then capable of illuminating the legend plate with any one of a plurality of colors of light to denote the particular state or states of the item monitored.

Typically the identity and color of illumination of a particular indicator unit constitute an instruction for a particular action; for example, "Insert #4 Control Rod" or "Fire Missile D." Pressing the legend plate of the indication unit then automatically initiates the indicated action.

It is inherent in such an indicator unit that a relatively complex assembly of indicator lamps, switches, wires, and wire connections are required to achieve the desired indicator and switch capabilities. It is obvious, furthermore, that miniaturization is highly desirable in order to minimize the required panel space and optical scanning area for the human operator.

Attempts heretofore to provide miniaturization and compactness of multicolor indicator-actuators have resulted in units which are compromised in reliability and durability and which at the same time are mechanically difficult to service and maintain. Generally, special tools are required to replace burned out lamps, and in the process of relamping, loose parts are vulnerable to loss and inadvertent interchange, as of legend plates or colors of bulb color filters. Obviously any such error in reassembling the unit could have gravely serious consequences regarding the operation of the sytem. Prior art systems typically cause the existence of loose parts during servicing because, for example, the conventional colored plastic covers or filters for the lamps must be removed when the lamp is removed. Typically, also, the legend plate is removed in order to provide access to the lamps.

Other shortcomings of prior attempts to provide a compact, reliable indicator assembly are that even the better of these have resulted in units which create heat dissipation problems, are difficult and expensive to manufacture and install, and require a large depth behind the mounting panel either because of the depth of the unit or because servicing and installation wiring must be done from the rear of the unit. In addition, such units are not environment-proof regarding dust and moisture, and do not provide an intense, even illumination across the legend plate, but rather are generally dim with "hot" spots on the indicator face. Prior art attempts to provide brilliant, even illumination have typically been directed toward larger and more powerful lamps. However, such attempts aggravate the heat dissipation problems in a large panel and create a thermal stress on other elements of the indicator units thereby decreasing the overall reliability.

It has been the practice in accordance with the better prior indicator art to "double lamp" each color with two lamps in parallel in order to aid the operator in distinguishing a burned out lamp from a proper lack of energization of a particular color in a unit. However, the problem of achieving even distribution of illumination over the legend plate even with two bulbs without overheating and hot spotting has been difficult to solve; and heretofore there has not been available a double lamped unit which has even a reasonably satisfactory illumination when one lamp is burned out. Typically, the illumination is not even and is not intense enough to be noticed in an environment of usefully ambient light such as an airplane cockpit.

Another area of deficiency in the prior art is the switching action achieved by depressing the legend plate. Typically, relamping of prior art devices inherently causes a switching action when the unit is reassembled. In addition their construction is such as to cause them to be vulnerable to accidental actuation when the operator inadvertently touches or brushes the panel or is thrown thereagainst due to vehicle or ship acceleration.

In addition when the switch is actuated, the lamps and their contacts are jared or accelerated thus affecting their reliability due to contact strain or filament breakage.

A final area of prior art deficiency, the curing of which is an object of the present invention, is that of the inconvenience and labor costs in installing the prior art multicolor indicator-actuator units. Such devices typically require soldering of connections and other activities behind the mounting panel and require time of the order of an hour to drill holes, mark, remove, and resolder leads, and check out the hookup when a unit is installed or replaced.

Specifically, it is an object of the present invention to provide a compact, reliable, multicolor, double lamped indicator-actuator assembly which is not subject to these and other disadvantages of the prior art.

It is another object to provide such a unit which is an integral assembly and which captively holds all parts during lamp testing and relamping procedures.

It is another object to provide such a unit which exhibits an even and vivid brilliance over the entire legend plate regardless of lamp burnout or lamp color.

It is another object of the invention to provide such a double lamped unit which has a useful, even brilliance when only one lamp is energized thus enabling a double number of indication functions, when desired, by virtue of two levels of brilliance for each color or a double number of colors because only one bulb is needed for a full, even brilliance.

It is another object of the invention to provide such a double lamped unit which may be "plugged into" the panel from the front without soldering of connections on the unit.

It is another object of the invention to provide such a double lamped unit which may be relamped without removal of lamp color filters from their place in the unit.

It is another object of the invention to provide such a unit in which relamping may be achieved and legend plates changed without switch actuation.

It is another object of the invention to provide such a unit which directs the lamp heat out of the unit into the environmental space.

It is another object of the invention to provide such a unit which is substantially sealed and environment proof.

It is another object of the invention to provide such a unit which is at least 100% shorter in depth than double-lamped multicolor switch indicators heretofore available.

It is another object of the invention to provide such a unit which is not vulnerable to accidental switch actuation.

It is another object of the present invention to provide such a unit in which the lamp filament and the lamp contacts do not suffer acceleration or relative movement, respectively, during switch actuation.

Briefly, these and other objects and advantages are achieved in one example of the present invention in which a lamp holder member is provided having a frontally relieved region which defines a reflector cup into which three lamp envelopes project laterally inwardly toward each other from each of two opposite sides. Each of the six bulbs is retained in one of six parallel bores communicating through the opposite sides of the member into the reflector cup. Within each bore at a predetermined distance from the side of the member, a retaining shoulder is disposed. A colored plastic filter cap is placed with its base lip against the shoulder and its cylindrical body extending through the remainder of the bore into the reflector cup. An outwardly biasing, short coil spring is placed against the base lip in a manner to extend toward the side of the lamp holder member.

A conventional miniature indicator lamp may then be inserted through the bore from the side, radially within the coil spring and the retaining shoulder, and into the plastic filter cap. The mounting shoulder about the base of the lamp is received by the bore and engages the end of the coil spring which urges the central contact point of the lamp outwardly slightly beyond the side of the lamp holder member for positive electrical contact with other conductors.

The reflector cup is a highly reflective surface with elemental surface portions cooperatively contoured behind, between, and forwardly of the lamp envelopes to distribute the light from any one bulb to all portions of the frontal area of the reflector cup.

The invention includes mounting structure which not only provides unusually large and stable gripping forces for securing the lamp holder assembly onto a supporting panel, but achieves such results by a one step process from the front of the panel with the aid of merely a simple tool such as a screwdriver or Allen wrench.

When the assembly is assembled and mounted, a central, axially extending pin or rod member, which provides mechanical coupling from the rear of the legend plate through the lamp holder assembly to the switch mechanism housed in the rear of the housing body, makes mechanical contact with a transversely disposed toggle sheet in front of the switch mechanism. The toggle sheet is snapped momentarily rearwardly by axial displacement of the pin member when the legend plate is depressed. The toggle sheet in turn makes mechanical contact with the electrical switch mechanism in a manner to change its state of electrical connection when the toggle sheet is snapped rearwardly. The toggle sheet feature embodied in the invention adds significantly to its mechanical and electrical reliability and makes it possible to provide a multi-color switch indicator which is less than half as deep in the direction normal to the mounting panel than are other such devices heretofore available.

Further details of these and other novel features including the means for electrical connection within the assembly, for example, as well as additional objects and advantages of the invention will become apparent and be best understood from a consideration of the following description taken in connection with the accompanying drawings in which.

Referring to the figures in more detail, it is stressed that the particulars shown are by way of example only and are presented in the cause providing what is believed to be the most useful and readily understood description of the principles and concepts of the invention. The detailed showing is not to be taken as a limitation upon the scope of the invention which is defined by the appended claims forming a part of this specification.

Figure 1:
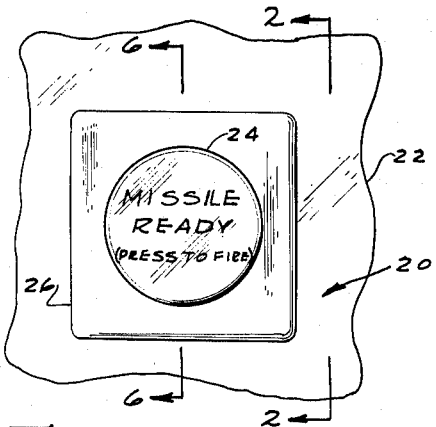
FIG. 1 is a frontal elevational view of a switch assembly unit constructed and mounted in accordance with the principles of the present invention.

In FIG. 1 a frontal view of a multicolor indicator switch actuator assembly 20 is shown mounted on a panel 22. The unit includes a legend plate 24 having a front surface substantially coplanar with that of a legend plate retaining rim 26. The unit of this example is adapted to provide a number of indication functions as by six different colors of lamps or three different double lamped colors each with two different intensities. The switching actuation is accomplished, as indicated by the legend on the plate 24, by depressing the legend plate 24 into the plane of the paper until a stop is reached or a positive switching action is felt.

Figure 2:
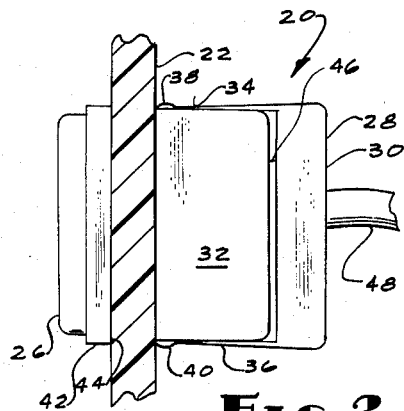
FIG. 2 is a partially sectional view of the structure of FIG. 1 taken along the lines 2—2 thereof.

In FIG. 2 a sectional view is presented, as indicated by the sectioned reference numerals 2—2 of FIG. 1, which shows the mounting panel 22 in section and the indicator switch assembly 20 in side elevation. The exposed portions of the assembly 20 include the legend plate retaining rim 26. A mounting bracket 28 is illustrated having a rear portion 30 disposed across the rear closed end of a hosing body 32 and a pair of side extension members 34, 36, which are disposed along a pair of opposite sides of the housing body 32 and include outwardly bowed portions 38, 40, the latter being impressed compressively against the rear surface of the mounting panel 22. The side extension members 34, 36 extend forwardly through the mounting panel 20 and are terminated against the rear edge of a forward rim portion 42 of the housing body 32 which defines a mounting shoulder 44. The inner cross dimension of the forward rim portion 42 is effectively slightly larger than the outer cross dimension of the legend plate retaining rim 26 so that the latter may fit snugly therewithin.

Projecting from the rear of the housing body 32 there is disposed a connector portion 46 which includes conductive members which mate with associated ones carried within the mounting bracket 28. A connecting cable 48 may include flexible conductors which are connected to the mating conductors within the mounting bracket 28.

Figure 4:
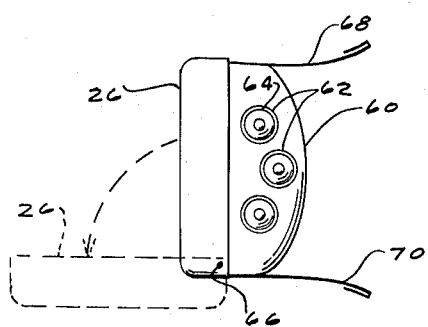
FIG. 3 and FIG. 4 are side elevational views of the structure of one example of the present invention illustrating certain steps in the mounting and assembly thereof.
Figure 3:
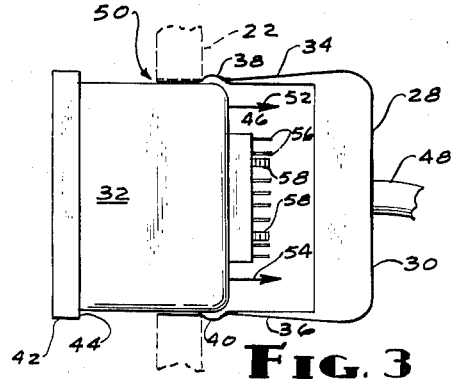

Referring to FIG. 3 and FIG. 4, the assembly 20 is illustrated as though interrupted during the process of mounting it through the mounting panel 22, shown here in dotted lines. The mounting bracket 28 is shown as being substantially in position with its side extension members 34, 36 extending through a mounting opening 50 and terminating at or near the front surface of the mounting panel 22. The outward peak of the bowed portions 38, 40 are shown to be disposed just rearwardly of the rear surface of the mounting panel 22. The housing body 32 is shown stopped in the process of being inserted through the mounting opening 50 within the side extension members 34, 36 of the mounting bracket 28. In the process of mounting, the housing body 32 is moved further rearwardly as indicated by the motion arrows 52, 54 until its rear surface is closely contiguous to or in contact with the front surface of the rear portion 30 of the mounting bracket 28. In such final disposition, the mounting shoulder 44 extends beyond the extremity of the mounting opening 50 and contacts the front surface of the mounting panel 32 about the entire periphery of the mounting opening 50. The conductors 56 extending from the connector portion 46 are, when thusly mounted, inserted within and in contact with mating connectors within the rear portion 30 of the mounting bracket 28.

When the housing body 32 is in this manner inserted through the mounting opening 50 and plugged into the mounting bracket 28, a pair of mounting screws 58 are engaged by mating threads within the rear portion of the mounting bracket 28 and are drawn up so as to compress tightly the front extremity of the side extension members 34, 36 against the mounting shoulder 44 and increase the magnitude of outward bowing of the outwardly bowed portions 38, 40. The latter, due to their compressive contact with the rear edge of the mounting opening 50, urge the assembly rearwardly and tightly bind the mounting panel 22 between mounting shoulder 44 and the outwardly bowed portions 38, 40. This process constitutes the total effort required in the secure but removable mounting of the assembly 20 to the mounting panel 22. It remains merely to insert a lamp holder assembly 60 into the housing body 32 through its open front end within the forward rim portion 42 as shown more clearly in FIG. 5. The lamp holder assembly 60 is shown as including a plurality of laterally extending lamp retaining bores 62 within each of which is shown disposed an indicator lamp 64, shown here with their contact ends projecting outwardly from the central portion of the lamp holder assembly 60. The legend plate retaining rim 26 is disposed snugly over the frontal portions of the lamp holder assembly 60 and is hingedly affixed thereto by a pin hinge 66 so that the legend plate retaining rim 26 may be hinged downwardly and outwardly to form a retaining tray for the legend plate and provide access, when desired, into the central portion of the lamp holder assembly 60. It may be noted that relamping may be accomplished without moving the retaining rim 26 with respect to the lamp holder assembly 60, since the indicator lamps 64 may be removed from the side of the assembly behind and clear of the retaining rim 26.

When the assembly 60 is inserted into the housing body 32 a pair of withdrawal limiting clips 68, 70 which extend rearwardly from the sides or top and bottom of the assembly 60 are engaged by matching clips, not shown in these figures, within the housing body 32. The clips 68, 70 are preferably formed of spring metal, such as spring steel or beryllium copper, for example, and are shaped to bow outwardly as shown so as to assure contact with the mating clips within the housing body 32 and to provide ground electrical contact, when desired, between the assembly 60 and the housing body 32.

Figure 5:
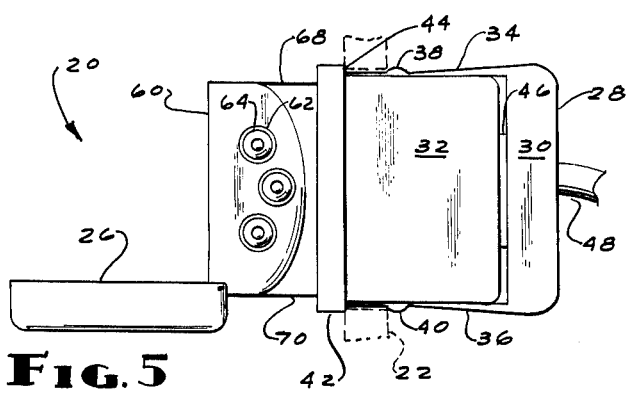
FIG. 5 is a side elevational view of the structure of the example of the invention illustrated in the previous figures which is mounted but is opened as for inspection or relamping.

In FIG. 5 the assembly 20 is shown mounted and assembled as in FIG. 2, except that the housing assembly 60 is shown withdrawn from the interior of the housing body 32 to the extent permitted by the withdrawal limiting clips 68, 70 as for purposes of relamping the indicators. In addition, the lens retaining rim 26 is shown in its lower hinged position as for purposes of removing or exchanging the legend plate.

Figure 6:
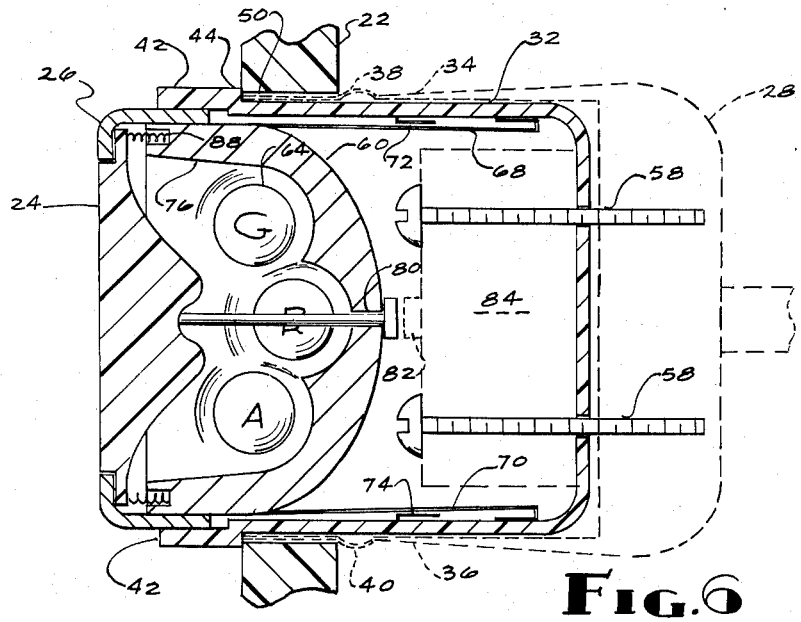
FIG. 6 is a sectional view of the structure illustrated in FIG. 1 taken along the lines 6—6 thereof.

Referring to FIG. 6, the vertical section taken through the center of the structure illustrated in FIG. 1 is presented. In this view the housing body 32 is shown in more detail and is indicated in this example as being fabricated of a non-conductive rigid, plastic. The cross dimension of the housing body 32 rearwardly of the forward rim portion 42 is seen to be slightly smaller than that of the mounting opening 50 in the mounting panel 22 in order to permit the passage there between of the forward end portion of the side extension members 34, 36 of the mounting bracket 28 all shown in dotted lines. Again, the outwardly bowed portions 38, 40 of the side extension members are seen to be compressed outwardly and forwardly against the rear edge of the mounting opening 50 in a manner to compress the mounting panel 22 firmly between the mounting shoulder 44 and the outwardly bowed portions of the mounting bracket. Thus the entire assembly is held firmly at two spaced sets of contact regions, namely, that formed at the rear of the mounting shoulder 44 and that formed by the contact with the outwardly bowed portions 38, 40 and the mounting bracket.

The mounting screws 58 are seen to constitute tension members for drawing the mounting bracket relatively forwardly against the housing body 32. The forward rim portion 42 is seen here more clearly to form a frictional receiving means for the legend plate retaining rim 26. The friction between the rim 26 and the forward rim portion 42 of the housing body 32 is preferably made to be adequate by conventional means to retain the assembly against accidental dislodgement. The friction between the retaining rim 26 and the housing assembly 60 is made to have a magnitude so that in spite of the drag by the clips 68, 70 and the bulb contacts, the entire assembly 60 will be withdrawn from the housing member 32 when the retaining rim 26 is withdrawn from the rim portion 42. Mating clips 72, 74 are disposed within the housing body 32 in a position to engage the extending clips 68, 70 to limit the extent of withdrawal of the assembly 60 from the housing body 32. The withdrawing limiting means may be defeated when desired by partially withdrawing the assembly 60, depressing the clips 68, 70 inwardly, and then withdrawing the entire assembly all the way.

The lamp holder assembly 60 is shown in this figure to include a concave reflector surface 76. The indicator lamps 64 are fitted with colored filter caps thereover, indicated by "G," "R" and "A" to signify that their colors are green, red, and amber, respectively. The concave reflector surface 76 is contoured, as shown about, in back of, and forwardly of each of the lamps 64 in a manner to reflect and project and disperse their illuminating energy forwardly toward the legend plate 24. A switch actuating rod 78 is disposed centrally through the assembly 60 by means of a supporting opening 80 therein. The switch actuating rod 78 is adapted to be engaged, for longitudinal displacement, by the rear surface of the legend plate 24 and to contact the switch actuator member 82 of an electrical switch mechanism 84. In this example of the invention, the positive toggle action of the switch mechanism 84 is transmitted back through the rod 78 so that the operator may feel definitely the changing of the switching state of the switch mechanism 84. Resilient means for aiding in the return and orientation of the legend plate 24 are provided in the form of small springs 86 disposed between the forward face of the assembly 60 and the rear surface of the legend plate 24 and retained by small bores 88 formed perpendicularly into the face of the former.

The body of the assembly 60 may be formed of a metal, as indicated, which may be aluminum. In this case, the reflector surface 76 may be made highly reflective simply by conventional finishing techniques. However, in other embodiments of the invention, the body of the assembly 60 may be formed of a rigid plastic substance in a plurality of moulded sections and the reflector surface 76 formed by vacuum plating a bright metal onto the surface of the plastic substance.

Figure 7:
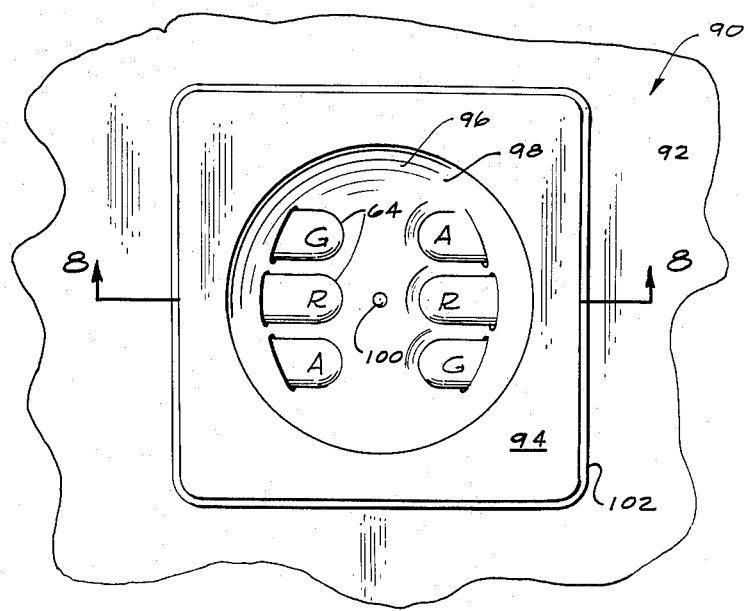
FIG. 7 is a frontal elevational view of an example of the invention similar to that of the previous figures in which the legend plate has been removed for purposes of illustration.

In FIG. 7 an example of the invention is illustrated in frontal elevation. An indicator switch unit 90 is shown mounted upon a mounting panel 92. A legend plate retaining rim 94 is shown with its legend plate removed in order to illustrate a frontal elevational view of a concave reflector surface 96 relieved from the front of a lamp holder member 98. Six indicator lamps 64 are shown projecting laterally into the cup formed by the reflector surface 96 and covered by a colored filter envelope as indicated by the letters "G," "R," or "A." A switch actuating rod 100 is shown end-on for mechanical communication between the legend plate and the switch mechanism, both not shown.

Figure 8:
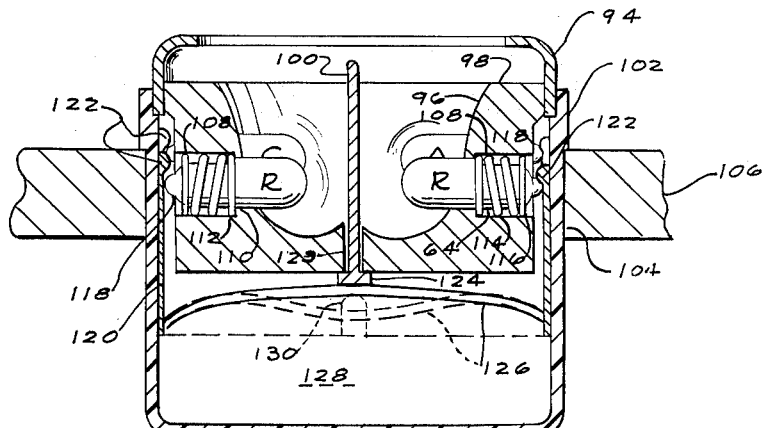
FIG. 8 is a sectional view of the structure of FIG. 7 taken along the lines 8—8 thereof.

In FIG. 8 a horizontal sectional view of the structure shown in FIG. 7 taken through its center is illustrated. A housing body 102 similar to that shown in the previous figures, is disposed within a mounting opening 104 of a mounting panel 106. The mounting means and the relationships between the housing body 102, the legend plate retaining rim 94, and the lamp holder member 98 are substantially identical to those discussed above in connection with the earlier figures.

A plurality of laterally directed bores 108 are provided in the lamp holder member extending from opposite sides thereof into the cup formed by the reflector surface 96. A retaining shoulder 110 is provided in each of the bores 108 near the reflector surface 96 for retaining the base lip 112 of the plastic color filters as shown. A short, outwardly biasing spring 114 is disposed within each of the bores 108 adjacently to the lip 112. An indicator lamp 64 may then be inserted from the side of the lamp holder member 98 radially within the spring 114 and into the color filter until the mounting shoulder 116 engages the spring 114. The spring 114 has a length which just firmly causes the central contact 118 of the lamps 64 to contact a respective conductive strip 120 disposed on the inner side surface of the housing body 102. Each of the conductive strips 120 is provided with an inwardly raised portion 122 which forms, in cooperation with the central contact 118 of each of the lamps 64, a ball and detent retaining means for positively securing the lamp holder member 98 within the housing body 102. In addition to the positive friction provided by this spring ball and detent system, a positive feel to the operator is provided for indicating when the lamp holder member 98 has been properly inserted within the housing body 102.

The switch actuating rod 100 passes through and is supported by a central bore 122 through the lamp holder member 98. The rearwardly disposed end of the rod 100 may be terminated with a retaining end 124.

A toggle sheet 126 is retained under compression along its length between a pair of retaining channels, not shown in this view, in the sides of the housing body 102. The length of the toggle sheet 126 and the orientation of its retaining channels are such that as retained by the sides of the housing body 102 it bows forwardly, or outwardly, to a point contiguous to the switch actuating rod 100. When the rod 100 is depressed toward the rear of the housing body 102, it in turn depresses the center of the toggle sheet 126 causing it to "toggle" to a low energy position, indicated by the dotted lines, which although only a small force is required to hold it there, is not a stable position. Thus when the rod 100 is released and permitted to travel longitudinally back toward the front of the unit, the toggle sheet 126 abruptly turns to its normal, forwardly bowed position.

A switching mechanism 128 which may be extremely compact and elementary in form, because it need not include its own toggle mechanism, is secured in the rearward portion of the housing body 102. The switching mechanism 128 includes an actuator 130 which is contacted and driven by the toggle sheet 126 and which changes the state of the electrical switch mechanism 128 at a point between the lower extremity of the travel of the toggle sheet and its "dead center" position approximately midway between the two positions shown for the toggle sheet 126. By this means when the toggle sheet is depressed and the operator feels the toggle action through the rod 100, he knows that the state of the electrical switch mechanism 128 has been reversed.

Figure 9:
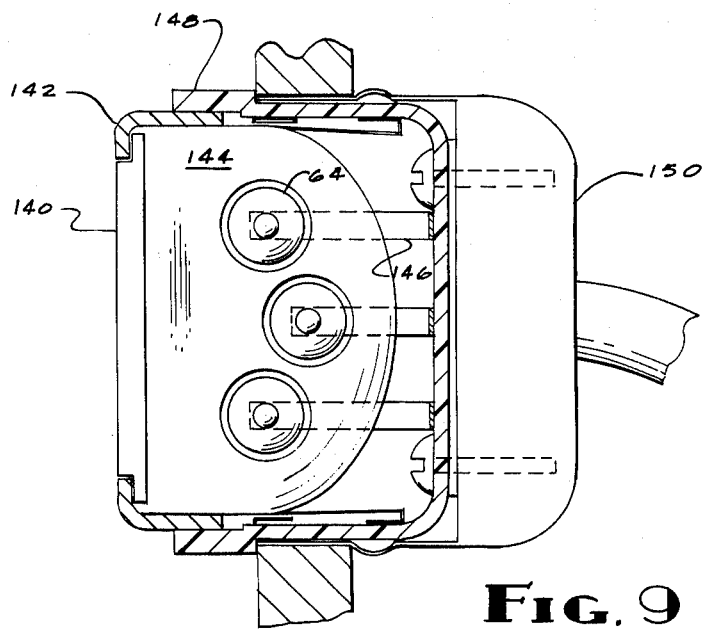
FIG. 9 is a sectional view of an example of the invention which does not include an integral switching mechanism.

In the example of the invention illustrated in FIG. 9, a multicolor indicator is shown partially in section which does not include switching mechanisms. The structural features of this example of the invention are, in most respects, substantially identical to those discussed above in connection with the earlier figures, except that the entire unit may be foreshortened due to the absence of a switching mechanism. In addition, a raised, exposed portion of its indicator legend plate 140 which protrudes through the legend plate retaining rim 142 may be different in shape from that of the previous examples. For example, the raised portion and the frontal opening in the retaining rim 142 may be square or triangular to indicate that the unit is an indicator as opposed to the circular exposed portions of the legend plates of the previous examples which may be round to indicate that their associated unit is a switch indicator assembly. Further in the example of FIG. 9, a lamp holder member 144, shown in side elevation may include a plurality of indicator lamps 64 which make sliding ball and detent contact with elongated connecting strips 146 which communicate electrically with the electrical connector portions at the rear of a housing body member 148 and mounting bracket 150. Since no displacement of the legend plate 140 is necessary in this example, it may be retained closely between the front surface of the lamp holder member 144 and the inner surface of the rim 142. Thus the entire assembly may be considerably shortened in depth and still exhibit all the indicator advantages pointed out above.

Figure 10:
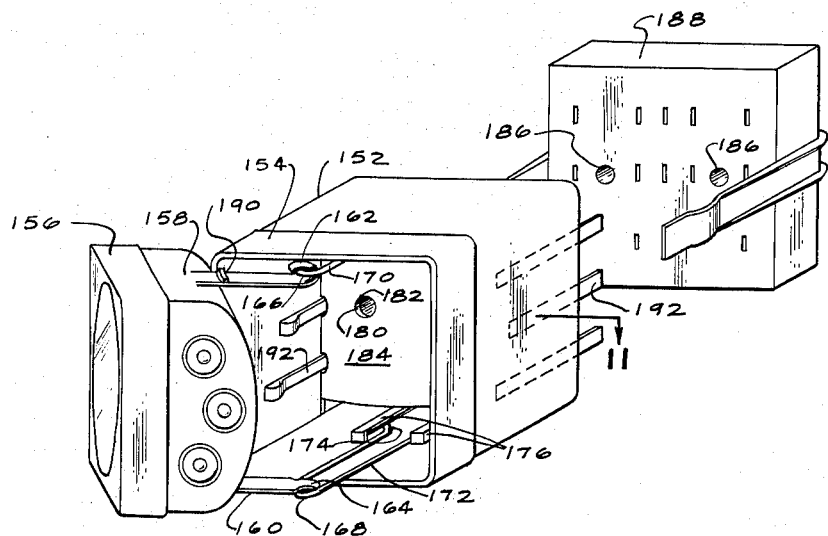
FIG. 10 is a perspective view of an alternative example of the present invention.
Figure 11:
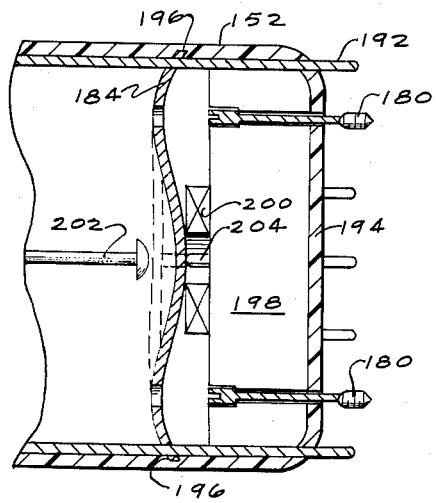
FIG. 11 is a sectional view of a portion of the structure of FIG. 10 taken along the lines 11—11 thereof.

Referring to FIG. 10 and FIG. 11, an alternating example of the invention is illustrated. In this example a housing body 152 is provided having a forward, enlarged rim portion 154 substantially similar to the configuration described above in connection with the previous examples. Here, the lamp holder assembly 156 includes withdrawal limiting and supporting or clips 158, 160. The ends of the clips 158, 160 are shaped to form an outwardly curved hook portion 162, 164 each of which is inserted through and are urged outwardly against the bight 166, 168, respectively, of a telescoping clip member 170, 172. The clips 170, 172 include a pair of parallel, straight portions as shown and are terminated by outwardly turned end elements 174 which fit within channels 176 and which permit the clips 170, 172 captively to slide forwardly to increase the degree of withdrawal of the assembly 156 from the housing body 152. In addition, the diameter of the bight 168, 166 is adequate to permit the swivelling therewithin of the hook portions 162, 164. In this manner the assembly 156 may be withdrawn from the housing body 152 and, when fully extended, be swivelled as shown to permit access to the mounting screws 180 through aligned apertures 182 in the toggle sheet 184.

In this manner the entire assembly may be mounted without ever removing any part or portion of the assembly. When the mounting screws have been drawn up into the threaded openings 186 in a mounting bracket and connector 188, the assembly 156 may be swivelled to a straightened position, and inserted fully into the interior of the housing body 152. After the clips 158, 160 have been substantially inserted, a ridge 190 disposed on the outside surface of the clips 158, 160 engages the bight 166, 168 and further insertion of the assembly 156 causes the clips 170, 172 to be moved along the channels 176 toward the rear of the unit.

A plurality of rigid conductive strips 192 are secured to the inner surfaces of the housing member 152 and have extensions projecting through the body 152 to form male connectors for insertion within the mounting bracket and connector 188. The toggle sheet 184 is relieved along its end portions, as shown, to permit the passage of the conductive strips 192.

Referring more particularly to FIG. 11, the housing body 152 is shown in section with the conductive strips 192 secured to its inner surfaces and extending through the rear portion 194 thereof to form the male conductive connectors. The toggle sheet 184 is also shown in section and is foraminated as indicated to permit access to the mounting screws 180 and passage of the conductive strips 192 therepast. The retaining channels 196 in the housing body 152 which were mentioned but not shown above retain the toggle sheet 184 in the desired, forwardly inclined, "buckled" position.

A switching mechanism 198 is shown in block form and includes a holding solenoid 200 which may be wafer thin in a toroidal configuration and use as its armature the toggle plate or sheet 184 itself. In this case the toggle plate must, of course, be fabricated from a paramagnetic metal. Because the depressed non-stable position of the toggle plate 184 is a low mechanical energy state for the toggle sheet, a very small holding current in the solenoid 200 is required to hold the toggle sheet in that position. In operation, when the switch actuating rod 202 is depressed, that is moved longitudinally toward the switching mechanism 198, the toggle sheet 184 "pops" to its position against the holding solenoid 200 and holds a switch actuating member 204 in its momentary contact state where it will remain for so long as the toggle sheet 184 is held in the deformed position against the solenoid 200 either by electrical energization thereof or by a maintained depression of the rod 202 by the operator's digit.

There has thus been disclosed a number of examples of a multicolor indicator switching unit in accordance with the present invention which achieve the objects and exhibit the advantages set forth above.

What is claimed is:

1. A multilamp indicator assembly of the character to be secured within an aperture on a mounting panel and comprising: a thin-walled housing body having rear and side surfaces, an open front, and a mounting rim disposed about the periphery of said open front, said rim defining a mounting shoulder along its rear edge for contacting the front surface of said panel contiguously to the periphery of said aperture; a mounting bracket having a rear portion adapted to be disposed across said rear surface of said housing body and having side members extending along said side surfaces of said housing body, said side members each having a bowed portion disposed contiguously to the rear of said panel when said assembly is mounted; securing means for drawing said rear portion of said mounting bracket toward said rear surface of said housing body and urging said side members compressively against said panel thereby binding said panel securely between said side members and said mounting shoulder; a lamp holder assembly adapted to be removably inserted within said housing body, said holder assembly having a front surface relieved to form a reflective cup, said holder assembly being additionally relieved to form a plurality of laterally extending lamp retaining bores communicating from said reflective cup through the side portions of said assembly; outwardly biasing spring means and retaining means therefor carried by said assembly for urging replaceable indicator lamps in said bores outwardly toward said side surfaces of said housing body when inserted; and withdrawal limiting, captively holding means connected between said assembly and said housing body for slidably supporting said assembly and permitting its withdrawal from said body to enable the side removal of said lamps from said assembly.

2. A multilamp indicator assembly of the character to be secured within an aperture on a mounting panel and comprising: a thin-walled housing body having rear and side surfaces, an open front, and a mounting rim disposed about the periphery of said open front, said rim defining a mounting shoulder along its rear edge for contacting the front surface of said panel contiguously to the periphery of said aperture; a mounting bracket having a rear portion adapted to be disposed across said rear surface of said housing body and having side members extending along said side surfaces of said housing body, said side members each having a bowed-out portion disposed contiguously to the rear of said panel when said assembly is mounted; the length of said side members being greater than that of said side surfaces of said housing body and having a forward end which, when said assembly is mounted, terminates against said mounting shoulder; securing means for drawing said rear portion of said mounting bracket toward said rear surface of said housing body and urging said forward ends of said side members compressively against said mounting shoulder thereby tending to increase the magnitude of bowing of said bowed-out portion and bind said panel securely between said bowed-out portions and said mounting shoulder; a lamp holder assembly adapted to be removably inserted within said housing body, said holder assembly having a front surface relieved to form a reflective cup, said holder assembly being additionally relieved to form a plurality of laterally extending lamp retaining bores communicating from said reflective cup through the side portions of said assembly; outwardly biasing spring means and retaining shoulder means therefor carried by said assembly within said bores near said reflective cup for urging replaceable indicator lamps in said bores outwardly toward said side surfaces of said housing body when inserted; and withdrawal limiting, captively holding means connected between said assembly and said housing body for slidably supporting said assembly and permitting its withdrawal from said body to enable the side removal of said lamps from said assembly.

3. A multilamp indicator assembly of the character to be secured within an aperture on a mounting panel and comprising: a thin-walled housing body having rear and side surfaces, an open front, and a mounting rim disposed about the periphery of said open front, said rim defining a mounting shoulder along its rear edge for contacting the front surface of said panel contiguously to the periphery of said aperture; a mounting bracket having a rear portion adapted to be disposed across said rear surface of said housing body and having side members extending along said side surfaces of said housing body, said side members each having a bowed-out portion disposed contiguously to the rear of said panel when said assembly is mounted; the length of said side members being greater than that of said side surfaces of said housing body and having a forward end which, when said assembly is mounted, terminates against said mounting shoulder; securing means for drawing said rear portion of said mounting bracket toward said rear surface of said housing body and urging said forward ends of said side members compressively against said mounting shoulder thereby tending to increase the magnitude of bowing of said bowed-out portion and bind said panel securely between said bowed-out portions and said mounting shoulder; a lamp holder assembly adapted to be removably inserted within said housing body, said holder assembly having a front surface relieved to form a reflective cup, said holder assembly being additionally relieved to form a plurality of laterally extending lamp retaining bores communicating from said reflective cup through the side portions of said assembly; outwardly biasing spring means and retaining shoulder means therefor carried by said assembly within said bores near said reflective cup for urging replaceable indicator lamps in said bores outwardly toward said side surfaces of said housing body when inserted; and withdrawal limiting, captively holding means connected between said assembly and said housing body for slidably supporting said assembly and permitting its withdrawal from said body to enable the side removal of said lamps from said assembly, said captively holding means including effectively telescopingly cooperative members, a first one of which is connected to said housing body and a second one of which is connected to said lamp holder assembly for permitting said lamp holder assembly to be withdrawn from said housing body to permit said side removal of said lamps and to provide access to said securing means.

4. The invention according to claim 1 in which at least one conductive strip is disposed along an inner surface of said housing body in line with an associated one of said lamp retaining bores and adapted to be in electrical contact with the lamp disposed in that bore by virtue of said outwardly biasing spring means, said conductive strips including a laterally, inwardly extending portion near its extremity toward said open end, said laterally inwardly extending portion forming, in cooperation with said outwardly biasing spring means and said lamp, a ball and detent retaining system for removably securing said assembly within said housing body.

5. The invention according to claim 4 in which said conductive strip extends through the rear, closed surface of said housing body and forms thereby a male connector pin.

6. A multicolor indicator assembly of the character to be mounted on a panel through a single mounting aperture, the assembly comprising: a housing body having an open front and a panel mounting rim disposed about the periphery of said open front; a mounting bracket disposed across the closed near of said housing body and having side members disposed along the sides of said body toward said front and in compressive mounting engagement with said panel, and mount securing means accessible from within said body through said front for drawing said mounting bracket against the rear of said body to provide said compressive mounting engagement; a lamp holding assembly having cross dimensions less than those of the inside of said body and having a frontally relieved surface forming a reflector cup, said holding assembly being laterally relieved to define a plurality of lamp holding bores communicating from said reflector cup through the sides of said holder assembly; retainer shoulder means disposed within each said bore near its end toward said reflector cup; at least one tube shaped color filter having a retaining lip about one end, said filter being disposed within one of said bores with said lip engaged by said shoulder means and extending into said reflector cup; outwardly biasing spring means disposed within each of said bores for engaging the mounting rim base of an indicator lamp and urging its center base contact toward a side of said housing body, said reflector cup being contoured around and in back of each said lamps to reflect and disperse its radiated energy forwardly, evenly across the frontal opening of said reflector cup a plurality of conductive strips disposed along a side of said body extending in the direction from the front to the back thereof and adapted to be in positive electrical contact with respective ones of said lamp center base contacts; a legend plate retaining rim member frictionally, removably held over the frontal regions of said lamp holder assembly and within said panel mounting rim of said housing body and being hingedly affixed to the former along its lower frontal edge; and a removable legend plate disposed between said lamp holder assembly and said legend plate retaining rim member.

7. The invention according to claim 6 which includes sliding withdrawal limiting means affixed between said lamp holder assembly and said housing body and including clip members having lengths which when extended permit access to said lamps for removal and replacement thereof without removing said filters.

8. The invention according to claim 6 in which said clip members are telescopically mutually engaged and which include horizontally swiveling joints for permitting access to said mount securing means without removal of said assembly.

References Cited by the Examiner

UNITED STATES PATENTS

| | | | |
|---|---|---|---|
| 2,434,065 | 1/1948 | Courtney | 200—167 |
| 2,437,555 | 3/1948 | Rees | 200—167 |
| 2,703,398 | 3/1955 | Harrington et al. | 340—381 |
| 2,745,094 | 5/1956 | Harrington et al. | 340—381 |
| 2,821,700 | 1/1958 | Harrington | 340—381 |
| 2,934,752 | 4/1960 | Arrasmith | 340—213 |
| 2,967,298 | 1/1961 | Riggens et al. | 340—381 |
| 2,998,597 | 8/1961 | Edwards | 340—378 |

NEIL C. READ, *Primary Examiner.*

W. C. GLEICHMAN, I. J. LEVIN, *Assistant Examiners.*